United States Patent Office 3,257,612
Patented June 21, 1966

3,257,612
ELECTRICAL CURRENT-BALANCING MEASURING SYSTEM FOR INDICATING A FREQUENCY DIFFERENCE
William Sterling Gorrill, Manhasset, and John A. Thurn, Old Westbury, N.Y., assignors to The Bristol Company, Waterbury, Conn., a corporation of Connecticut
Filed May 31, 1962, Ser. No. 198,826
15 Claims. (Cl. 324—69)

This invention relates to an electrical measuring system and more particularly to a method and apparatus for measuring the speed of rotation of a revolving member and the difference in speed between a plurality of revolving members.

In many industrial processes utilized in the textile, paper, rubber and plastics industries, the grade of a particular product is often critically dependent upon accurately predetermined roll speeds and differences in speed between successive rolls in a train. Roll speed refers to the peripheral speed, in convenient units, of a rotating roll while the difference in speed between two rolls is variously identified as "draw," "stretch" or "differential speed" in different industries. For simplicity, the one expression "differential speed" will be used throughout this application.

The exacting requirements of the aforementioned processes have hitherto called forth various methods ands instrumentalities for measuring roll speed and differential speed some of which, like the present invention, convert the speed of one or more rolls to signals whose frequency are proportional to the speed of the respective rolls. Various arrangements have been hitherto proposed for converting such signals into an indication of roll speed, or the differential speed between designated rolls in units such as feet per minute but such systems have left much to be desired.

We have discovered a method for deriving roll speed or differential speed which makes possible an exceedingly compact apparatus for carrying out such measurements with an extremely high degree of accuracy.

It is, therefore, a principal object of this invention to provide a uniquely simple system for measuring roll speed and differential speed with a high degree of precision.

A further object is to provide such a system which is readily adapted for carrying out roll speed measurements for any given speed of rotation and with virtually any desired range of differential speeds.

It is a more specific object of this invention to provide such a system which may be readily manufactured from standard commercial subcomponents so as to have a long trouble free life.

Another specific object is to provide such a system in which adjustments may be readily made to take into account variations in roll diameters such as may occur through wear, refacing operations or the like.

Further objects as well as advantages of the present invention will be apparent from the following description thereof and the accompanying drawings, in which.

Figure 1:
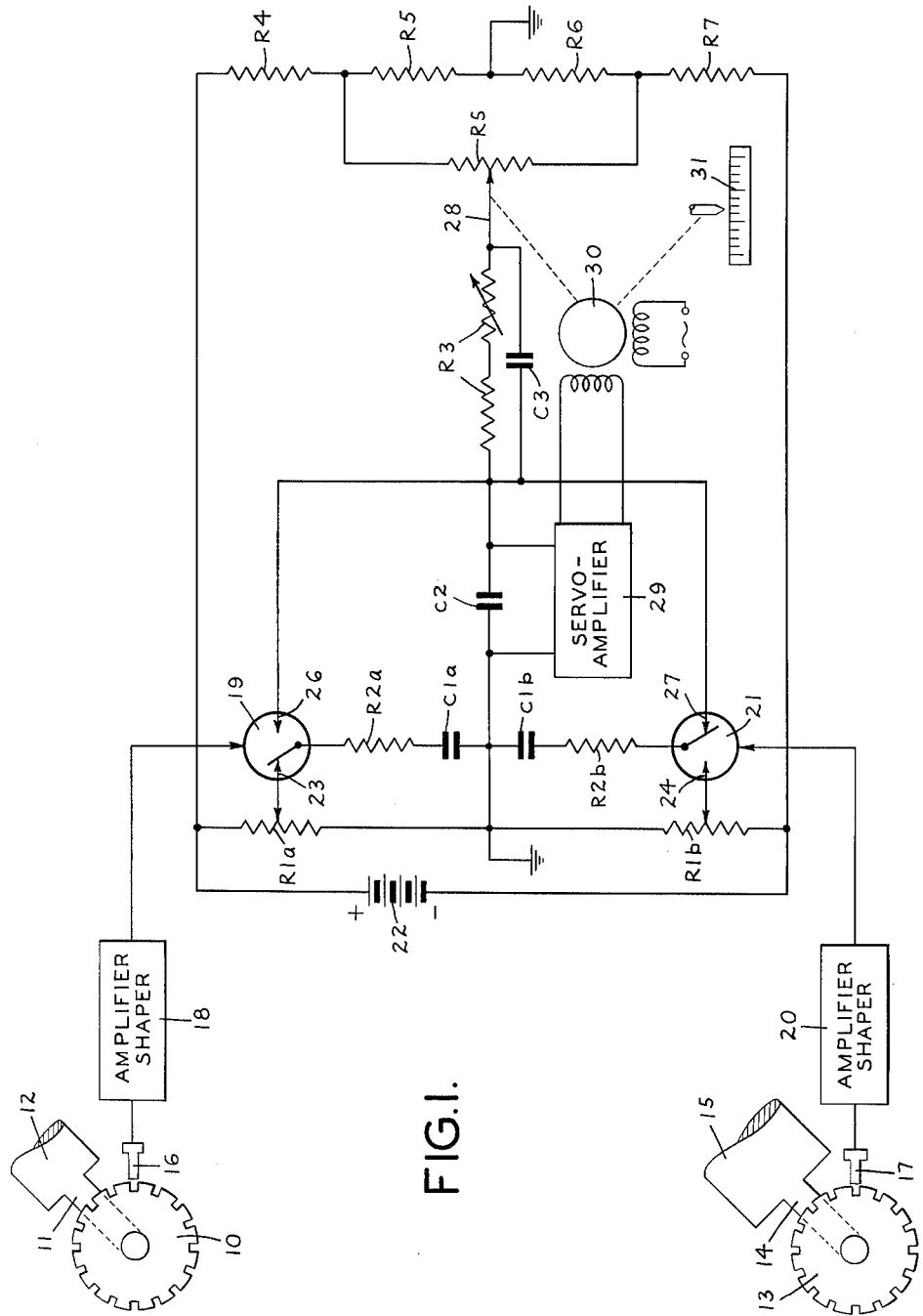
FIGURE 1 is a diagrammatic view of an embodiment of the present invention.

In determining the differential speed between two rolls, there are derived two signals such that one of the signals has a frequency which is proportional to the speed of rotation of one of the rolls and the other signal has a frequency which is proportional to the speed of rotation of the other roll. These signals in the form of voltage pulses of equal magnitude and duration (when the rolls are of equal diameter) but of opposite polarity are algebraically added to provide a net current which is proportional to the difference in frequency between the signals and, therefore, proportional to the difference in speed between the rolls from which the signals were derived.

The frequency difference current is nulled out by an equal but opposite balancing current the value of which is proportional to the desired differential speed. By drawing the balancing current from a calibrated, linear current supply, the desired measurement may be read directly from a linear dial.

To provide a continuous indication of the frequency difference between the two signals, the balancing current is preferably obtained from the slide wire of a self-balancing bridge network which operates continuously to maintain the movable contact of the bridge slide wire positioned such that the balancing current is equal and opposite to the frequency difference current. A conveniently calibrated scale is associated with the slide wire so that the position of a pointer in relation to the scale provides a measurement of the frequency difference. A recording chart and stylus may be associated with the self-balancing bridge so that the stylus provides a permanent record on the driven chart.

In carrying out measurements of the type referred to herein, it is essential that the probable error be kept to a minimum. In practice, it is extremely difficult to avoid non-linear effects due to changes in frequency when a signal is to be derived whose voltage is required to be proportional to the difference in frequency between two signals. Such difficulties are avoided in accordance with the present invention by utilizing a balancing current whereby to maintain equal to zero a voltage which otherwise would vary as the frequency difference varied. It is an important feature of the present invention that a capacitor is utilized to algebraically add the variable frequency pulses and the balancing current to the capacitor is adjusted to maintain in each cycle the average voltage across the capacitor equal to zero and the average current to or from the capacitor equal to zero.

When, as will be more fully described, the signal pulses whose frequency is to be compared each has a frequency proportional to the speed of rotation of a roll, the voltage of the signal pulses to be algebraically added is readily adjusted to compensate for differences in diameter between the the rolls. While the present invention will be described in greater detail in connection with an apparatus for measuring the differential speed of rotating members, it is not intended to limit the present invention thereto and it is to be understood that the present invention is useful in measuring the difference in frequency between signals independent of whether the frequency of the signals is proportional to speed or other variable.

Referring now to FIGURE 1, a ferromagnetic, notched wheel 10 is mounted on the shaft 11 of roll 12 whose speed is to be determined or compared with that of a second roll. While the wheel 10 is shown mounted directly on the shaft of the roll 12, it may be connected thereto through a suitable gear train so that the speed of the shaft will be some desirable predetermined multiple of the speed of the wheel 10. Similarly, a ferromagnetic notched wheel 13 is mounted on or in connection with the shaft 14 of the second roll 15. Magnetic pickups 16 and 17 are positioned in juxtaposition with the periphery of the wheels 10 and 13, respectively. The wheels 10 and 13 have a predetermined number of notches or teeth formed therein which in passing the associated magnetic pickups cause a change in the magnetic field and the generation of voltage pulses, one for each notch or tooth. Thus, there is a predetermined number of pulses in the output of each magnetic pickup for each revolution of the associated roll and these pulse rates vary in strict proportionality to the speeds of the roll shafts.

The signal pulses from the magnetic pickup 16 are fed to an amplifier and shaper 18 of suitable, conventional construction to provide a symmetrical square wave output which is in turn utilized to excite the driving coil of a chopper 19. Similarly, the output from the magnetic pickup 17 is fed to an amplifier and shaper 20, identical to amplifier 18 whose output is also a symmetrical square wave but of a frequency corresponding to that generated at the pickup 17. The output from amplifier 20 is fed to the driving coil of a second chopper 21.

The arm of chopper 19, which is operated as a synchronous switch, is connected through a current limiting resistor R2a to one side of a capacitor C1a, the other side of which is connected to ground. Similarly, the arm of chopper 21 is connected through current limiting resistor R2b to one side of a capacitor C1b, the other side of which is also connected to ground. Capacitors C1a and C1b are matched and of equal capacitance. Without limiting the present invention thereto but solely for the purposes of illustration, practical values of various circuit components will be set forth. For example, resistors R2a and R2b may each have a value of 1,500 ohms and capacitors C1a and C1b each may have a value of .1 microfarad.

A stabilized, filtered and isolated direct current voltage source of 6 volts represented by battery 22 is connected across variable voltage dividing resistors R1a and R1b, 160 ohms each, the common junction of which is connected to ground and to the common junction of capacitors C1a and C1b. The variable tap of resistor R1a is connected to contact 23 of chopper 19, while the variable tap of resistor R1b is connected to contact 24 of chopper 21. The remaining contact 26 of chopper 19 and contact 27 of chopper 21 are connected together and to one side of a 50 microfarad capacitor C2, the other side of which is connected to ground.

During one half cycle of the driving signal applied to the chopper 19, with its arm against contact 23, capacitor C1a has a positive voltage applied thereto and is charged positively. In the next half cycle, the arm of chopper 19 being in engagement with contact 26, this positive charge is delivered to capacitor C2. Thus, chopper 19 is operated at a frequency corresponding to that of the pulses generated at pickup 16 and in each cycle capacitor C1a is alternately charged and then discharged into capacitor C2. It may be readily shown that when the average voltage across capacitor C2 is continuously maintained at zero, as in accordance with the present invention, the average current flowing from capacitor C1a to capacitor C2 is proportional to the pulse frequency when the capacitor C1a and the voltage picked off of resistor R1a are constant.

At the same time, chopper 21, being operated at a frequency corresponding to that of the pulses generated by pickup 17 representative of the speed of rotation of roll 15, alternately causes capacitor C1b to be charged negatively in one half cycle and in the next half cycle subtracts a corresponding quantity of charge from the capacitor C2. As before, the average current flowing from capacitor C2 to capacitor C1b is proportional to the pulse frequency of pickup 17 when the capacitor C1b and the voltage picked off of resistor R1b are constant and the average voltage across capacitor C2 is continuously maintained equal to zero.

It is to be noted that here and throughout the present application, that by "average" is intended an average over a time period such that the voltage across capacitor C2 is equal to zero for all practical purposes. In the present embodiment, the average time is determined by and is less than the minimum response time of the servo system yet to be described.

With the charge on the capacitors C1a and C1b of opposite polarity, it is evident that there is a net flow of charge or current to or from capacitor C2 which varies in accordance with the difference in frequency of the outputs of the pickups 16 and 17. In order to obtain an indication which is proportional to the frequency difference as represented by this net current, the common terminal of the contacts 26 and 27 with capacitor C2 is connected through resistor R3, having a total resistance of 100,000 ohms, to a calibrated, linear current supply as represented by the slide wire resistor RS. Movable contact 28 is shifted along the resistor RS to a point where current in the three legs connecting capacitor C2 to the contacts 26, 27 and the resistor RS have an algebraic sum equal to zero. This condition as represented by zero voltage across capacitor C2 can be readily determined by a voltmeter connected across capacitor C2.

In practice, a servo-amplifier 29 is connected across capacitor C2 which senses and amplifies any voltage that may appear across capacitor C2 and in turn energizes the balancing motor 30 in a direction and for a duration such as to shift movable contact 28 along the slide wire RS to a position such that the current resulting from the slide wire voltage to ground divided by the resistance R3 is equal and opposite to the current derived due to any difference between the frequencies at which the choppers 19 and 21 are driven. With the motor 30 at rest, contact 28 is positioned so that the voltage across capacitor C2 is equal to zero, the position of the contact 28 with respect to the slide wire RS is a measure of the differential speed between rolls 12 and 15. As shown, a pointer is linked with motor 30 so as to be driven thereby in step with contact 26 along a scale 31 suitably calibrated in units of frequency, revolutions per minute or feet per minute as desired. It is an important advantage of the present invention that the scale 31 is linear whether calibrated in terms of frequency, shaft or roll surface speed thereby facilitating its use and operation at widely different ranges.

A convenient range adjustment is provided by utilizing a fixed resistor of 90,000 ohms and a variable resistor of 10,000 ohms as the total resistance indicated at R3. About a 5 to 12 microfarad capacitor C3 is connected in parallel with resistor R3 as a lead capacitor to compensate for delays resulting from the combination of resistor R3 with capacitor C2 and also from the low pass filter network normally part of the input circuit of the servo-amplifier 29.

It is to be noted that the variable taps of resistors R1a and R1b are readily adjusted so that the voltages taken therefrom correspond to the sizes of the rolls 12 and 15. The dials associated with the variable taps of the resistors are calibrated in advance with respect to the diameters or circumferences of standard roll sizes and it is then only necessary to measure the rolls in use and adjust the dials accordingly.

When it is desired to measure the absolute linear speed of a roll surface, say, that of roll 12, it is only necessary to eliminate the signal from the other roll and to shift the range and operating point of the slide wire as will be more fully described in connection with FIGURE 2.

The operating point of the self-balancing bridge network is determined by the ratio of the voltage across slide wire RS to the resistance R3 in the circuit. The resistors R4–R7 determine the value of the voltage across the slide wire and, as will be more fully pointed out, resistors R4–R7 and resistor R3 are replaced by resistors of suitable value when it is desired to shift the operating point of the bridge so that the position of movable contact 28 will indicate the absolute surface speed of a selected roll.

A preferred embodiment of our invention will now be described in connection with FIGURE 2, which also incorporates the switching arrangements for obtaining the absolute linear speed of the surface of roll 12 and also for measuring the differential speed between roll 15 and a third roll (not shown), the magnetic pickup of which is indicated at 32. While only three magnetic pickups are shown in FIGURE 2, as many additional magnetic pickups may be utilized as there are rolls whose differential speed is to be measured. It is to be noted that in order to avoid unnecessary repetition, those parts in the embodiment now being described which are identical to corresponding parts described in connection with FIGURE 1, are identified in FIGURE 2 by the same reference characters.

Amplifier-shapers 18 and 20 are connected as before to the respective magnetic pickups but in the present instance the connection is made through ganged switches S1 and S2 in one position of which magnetic pickup 16 is connected to amplifier-shaper 18 and magnetic pickup 17 is connected to amplifier-shaper 20. In the other position of the switches S1 and S2, magnetic pickup 17 is connected to amplifier-shaper 18 and magnetic pickup 32 is connected to amplifier-shaper 20. It will be noted that switch S12, the arm of which is connected to amplifier-shaper 18 is interposed between the latter and switch S1 for a purpose yet to be described. Suffice it to note here that while carrying out differential speed measurements switch S12 completes a circuit between its contact D and the arm of switch S1, as shown.

As before, the symmetrical square wave outputs from the amplifier-shapers 18 and 20 are connected respectively to the driving coils of choppers 19 and 21. As many potentiometers are provided as there are rolls. Thus, in the present illustrative example, the three potentiometers are shown, one for each roll for which it is maintained calibrated. Four additional switches S3-S6 ganged with switches S1 and S2 are provided to accomplish the necessary switching. The arms of switches S3 and S4 are connected to opposite sides of battery 22 through the contacts D of switches S7 and S8, respectively. Connections between the ungrounded ends of the potentiometers R1a-c are provided to the contacts of switches S3 and S4, potentiometer R1b being connected to contact 2 of switch S3 and contact 1 of switch S4. The arms of switches S5 and S6 are connected respectively to the contacts 23 and 24 of choppers 19 and 21. Contact 1 of switch S5 is connected to the variable tap of resistor R1a while its contact 2 is tied to contact 1 of switch S6 which is in turn connected to the variable tap of resistor R1b. Contact 2 of switch S6 is connected to the variable tap of resistor R1c.

When the ganged switches S1-S6 are in their No. 1 positions, the connections between the magnetic pickups 16 and 17, potentiometers R1a and R1b and the contacts 23 and 24 of the choppers, are as was described in connection with FIGURE 1. When the ganged switches S1-S6 are shifted to their No. 2 positions, then the connection to potentiometer R1a is opened, potentiometer R1b is connected to the positive side of battery 22 with its variable tap connected to contact 23 of chopper 19, and potentiometer R1c is connected to the negative side of battery 22 with its variable tap connected to contact 24 of chopper 21. Thus, with the switches in the latter position, the system provides a measurement of the differential speed between the second and third rolls. Obviously, a fourth or additional rolls may be provided for by adding a corresponding number of magnetic pickups and potentiometers as well as additional positions on the ganged switches S1-S6 to accommodate them. As before, precise adjustment of the potentiometers R1a, R1b and R1c are made to take into account variations in diameter between the respective rolls.

Figure 2:
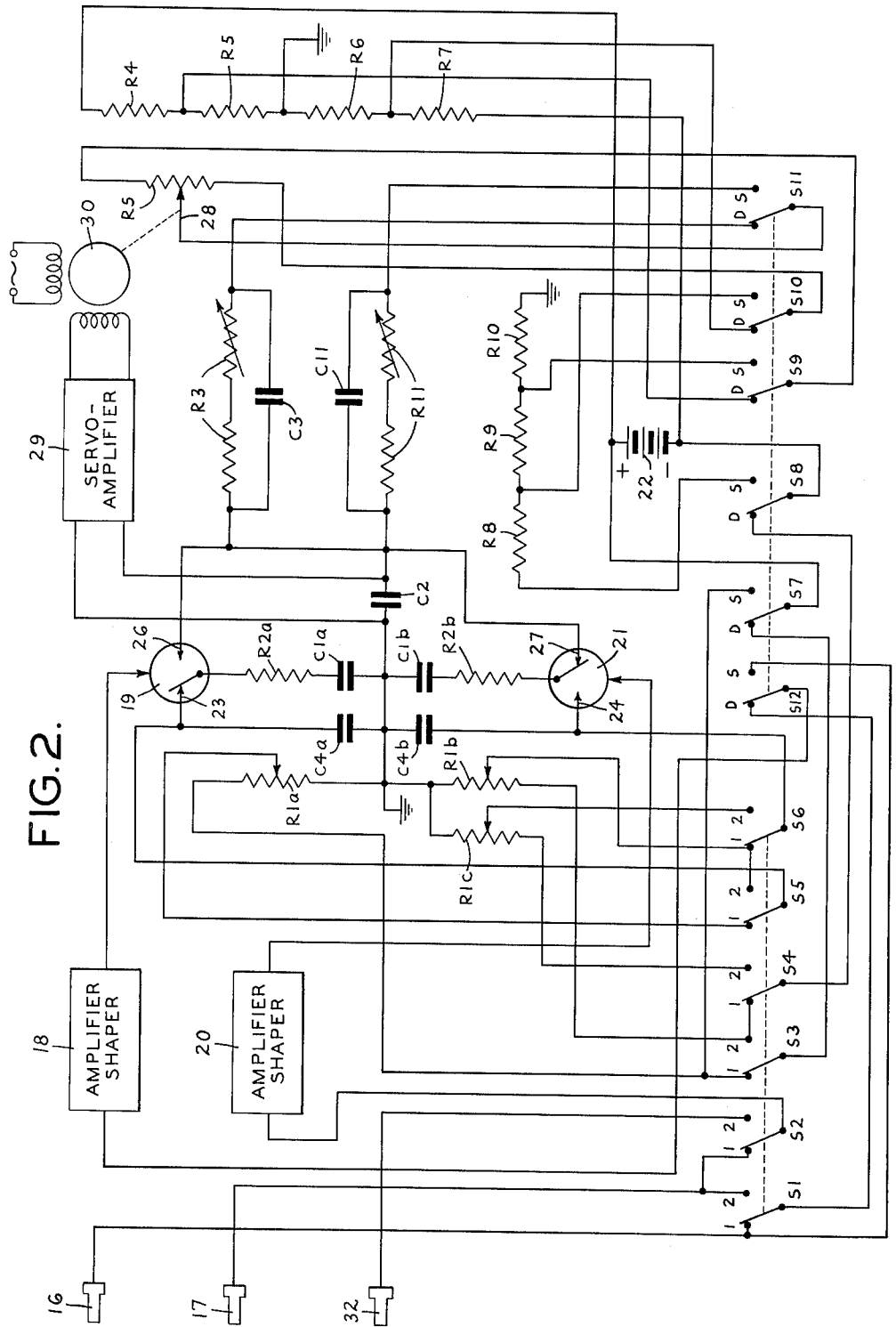
FIGURE 2 is a diagrammatic view of another embodiment thereof.

In the embodiment of FIGURE 1 and the corresponding portion of FIGURE 2 as thus far described, it will be noted that when either chopper draws its peak current to charge the associated capacitor C1a or C1b, the return path for this current includes the potentiometer R1b or R1a. In order to ensure mutual independence, capacitors C4a and C4b of relatively large capacitance as compared to capacitors C1a and C1b and of about 35 microfarads are connected respectively between chopper contacts 23 and 24 and ground. Thus, one side of capacitor C4a is connected to the common junction of switch arm S5 and contact 23, while one side of capacitor C4b is connected to the common junction of switch arm S6 and contact 24.

In operation, while the arm of chopper 19 is out of engagement with its contact 23, capacitor C4a is charged postively and thus, when the chopper arm is on contact 23, capacitor C4a supplies the peak current requirements. Because the capacitance of capacitor C4a is many times larger than that of capacitor C1a, the voltage across capacitor C4a remains essentially constant as is true also of capacitor C4b.

Ganged switches S7-S12 are provided to shift the apparatus from measuring the differential speed of the rolls to measure the absolute surface speed of one of them, roll 12 in the present instance. As shown, the arms of switches S7-S12 are all against the D contacts for measuring differential speed and in that position, movable contact 28 is connected to resistor R3 and the ends of slide wire RS are connected to the junction of resistors R4 and R5 and the junction of resistors R6 and R7, respectively. When switches S7-S12 are shifted to their contacts S for measuring absolute speed, the last mentioned connections are broken and now movable contact 28 is connected to resistor R11 through the S contact of switch S11, one end of slide wire RS is connected through the S contact of switch S9 to the junction of resistors R9 and R10 and the other end of the slide wire RS is connected through the S contact of switch S10 to the junction of resistors R8 and R9. As shown one end of the three series resistors R8-R10 is connected to ground while the other end is connected to the negative side of battery 22 through contact S of switch S8, shifting of the latter switch serving to open the connection from the battery to the arm of switch S4.

The operation of the system in measuring the absolute surface speed is essentially as was described in connection with the measurement of differential speed but now only the current from the discharge of capacitor C1a into capacitor C2 is nulled out by the current through the included portion of resistor R11; capacitor C1b, chopper 21, etc., being out of operation.

It may be noted that the connection of the contact S of switch S7 to potentiometer R1a and the connection of the contact S of switch S12 to contact 1 of switch S1 ensures that the surface speed of the roll 12, associated with pickup 16 and potentiometer R1a, will be measured independent of the position of the differential speed selector switches S1-S6.

The terms and expressions which have been employed are used as terms of description and not of limitation, and there is no intention, in the use of such terms and expressions of excluding any equivalents of the features shown and described or portions thereof, but it is recognized that various modifications are possible within the scope of the invention claimed.

We claim:

1. In an apparatus for providing an indication of the differential speed of two moving members, means associated with each of said moving members for producing a first and second series of signal pulses the frequency of repetition of each of which is proportional to the speed of the respective moving members, means forming first and second current paths of opposite polarity and predetermined voltages such that the currents in said paths are equal but of opposite polarity when said speeds are equal, means responsive to said first signal pulses for gating the flow of current in said first current path at a rate corresponding to the frequency of said first signal pulses, means responsive to said second signal pulses for gating the flow of current in said second current path at a rate corresponding to the frequency of said second signal pulses, means for algebraically adding the current flowing in said first and second current paths, means forming a third current path, and means for adjusting the value of the current in said third current path so as to be equal to but of opposite polarity to the algebraic sum of said first and second currents.

2. In an apparatus for providing an indication of the differential speed of two moving members, means associated with each of said moving members for producing a first and second series of signal pulses the frequency of repetition of each of which is proportional to the speed of the respective moving members, means forming first and second current paths of opposite polarity and predetermined voltages such that the currents in said paths are equal but of opposite polarity when said speeds are equal, means responsive to said first signal pulses for gating the flow of current in said first current path at a rate corresponding to the frequency of said first signal pulses, means responsive to said second signal pulses for gating the flow of current in said second current path at a rate corresponding to the frequency of said second signal pulses, means for continuously algebraically adding the current flowing in said first and second current paths, means forming a third current path, and means responsive to any difference in current in said first and second current paths for automatically adjusting the value of the current in said third current path to be equal to but of opposite polarity thereto.

3. An apparatus as set forth in claim 2 wherein said means for automatically adjusting the value of the current in said third current path includes a self-balancing bridge network.

4. In an apparatus for providing an indication of the differential speed of two moving members, means associated with each of said moving members for producing a first and second series of signal pulses the frequency of repetition of each of which is proportional to the speed of the respective moving members, a capacitor, means responsive to said first signal pulses for delivering current to said capacitor the average value of which is proportional to the speed of one of said two members, means responsive to said second signal pulses for withdrawing current from said capacitor at an average rate proportional to the speed of the other of said members, and means for providing a current to said capacitor for maintaining the average charge across said capacitor equal to zero and simultaneously providing an indication of the differential speed of said members.

5. In an apparatus for measuring the speed of moving members, means associated with each of two moving members for producing a first and second series of signal pulses the frequency of repetition of each of which is proportional to the speed of the respective moving members, a first capacitor, means including a first chopper for delivering current to said capacitor, means responsive to said first signal pulses for operating said first chopper at a corresponding frequency so that the average current delivered thereby to said capacitor is proportional to the speed of one of said moving members, means including a second chopper for withdrawing current from said capacitor, means responsive to said second signal pulses for operating said second chopper at a corresponding frequency so that the average current withdrawn thereby from said capacitor is proportional to the speed of the other one of said moving members, means for coupling at will only one of said choppers to said first capacitor, means forming a third current path with said capacitor, and means for adjusting the value of the current in said third current path so as to maintain the average charge across said capacitor equal to zero, whereby the value of the current in said third current path is proportional to the differential speed of said members when both said choppers are coupled to said first capacitor and proportional to the speed of one of said members when only the chopper associated therewith is coupled with said first capacitor.

6. In an apparatus for providing an indication of the differential speed of two moving members, means associated with each of said moving members for producing a first and second series of signal pulses the frequency of repetition of each of which is proportional to the speed of the respective moving members, a first capacitor, means including a first chopper for delivering current to said capacitor, means responsive to said first signal pulses for operating said first chopper at a corresponding frequency so that the average current delivered thereby to said capacitor is proportional to the speed of one of said moving members, means including a second chopper for withdrawing current from said capacitor, means responsive to said second signal pulses for operating said second chopper at a corresponding frequency so that the average current withdrawn thereby from said capacitor is proportional to the speed of the other one of said moving members, means forming a third current path with said capacitor, and means for adjusting the value of the current in said third current path so as to maintain the average charge across said capacitor equal to zero.

7. Apparatus as set forth in claim 6 wherein said third current path includes the movable contact of a self-balancing bridge network slide wire, a servo-amplifier connected across said first capacitor, and means linked with said movable contact and responsive to said servo-amplifier for moving said movable contact in a direction and for a duration corresponding to the polarity and duration of the charge across said first capacitor.

8. An apparatus as set forth in claim 6 wherein second and third capacitors are connected respectively in series with the arm of each of said choppers, said second and third capacitors in alternate half cycles of operation of said choppers being connected to voltage sources of opposite polarity and predetermined value and in the remaining half cycles of operation of said choppers being connected to one side of said first capacitor.

9. Apparatus as set forth in claim 8 wherein fourth and fifth capacitors are connected respectively across said voltage sources and during said alternate half cycles are connected respectively in parallel with said second and third capacitors, the capacitance of said fourth and fifth capacitors being large compared to that of said second and third capacitors.

10. Apparatus as set forth in claim 9 wherein the capacitance of each of said second and third capacitors is small compared to that of said first capacitor.

11. In an apparatus for providing an indication of a difference in frequency between a first and second signal whose frequency may differ from a nominal value, means forming first and second current paths of opposite polarity, means responsive to said first signal for gating the flow of current in said first current path at a rate corresponding to the frequency of said first signal, means responsive to said second signal for gating the flow of current in said second current path at a rate corresponding to the frequency of said second signal, the voltages of said currents being such that the currents in said paths are equal but of opposite polarity when said frequencies are equal, means for algebraically adding the currents flowing in said first and second current paths, means forming a third current path, and means for adjusting the value of the current in said third current path so as to be equal to but of opposite polarity to the algebraic sum of said first and second currents, whereby the value of the current in said third current path is proportional to the difference in frequency of said first and second signals.

12. In an apparatus for measuring the difference in frequency between a first and second signal whose frequency may differ from a nominal value, a capacitor, means including a first chopper for delivering current to said capacitor, means responsive to said first signal for operating said first chopper at a corresponding frequency so that the average current delivered thereby to said capacitor is proportional to the frequency of said first signal, means including a second chopper for withdrawing current from said capacitor, means responsive to said second signal for operating said second chopper at a corresponding frequency so that the average current withdrawn thereby from said capacitor is proportional to the frequency of said second signal, means forming a third current path with said capacitor, and means for adjusting the value of the current in said third current path so as to maintain the average charge across said capacitor equal to zero, whereby the value of the current in said third current path is proportional to the difference in frequency of said first and second signals.

13. In an apparatus for measuring the difference in frequency between a first and second signal whose frequency may differ from a nominal value, a capacitor, means including a first chopper for delivering current to said capacitor, means responsive to said first signal for operating said first chopper at a corresponding frequency so that the average current delivered thereby to said capacitor is proportional to the frequency of said first signal, means including a second chopper for withdrawing current from said capacitor, means responsive to said second signal for operating said second chopper at a corresponding frequency so that the average current withdrawn thereby from said capacitor is proportional to the frequency of said second signal, means for coupling at will only one of said choppers to said capacitor, means forming a third current path with said capacitor, and means for adjusting the value of the current in said third current path so as to maintain the average charge across said capacitor equal to zero, whereby the value of the current in said third current path is proportional to the difference in the frequencies of said first and second signals when both said choppers are coupled to said capacitor and proportional to the frequency of one of said signals when only the chopper associated therewith is coupled with said capacitor.

14. In an apparatus for measuring the speed of a moving member, means associated with said member for producing a series of signal pulses the frequency of repetition of which is proportional to the speed of said member, means forming first and second current paths, means responsive to said signal pulses for gating the flow of current of a predetermined voltage in said first current path at a rate corresponding to the frequency of said signal pulses, and means for adjusting the value of the current in said second current path so as to be equal to and of opposite polarity to that in said first current path whereby the value of the current in said second current path is proportional to the speed of said member.

15. An apparatus as set forth in claim 14 wherein said adjusting means includes a capacitor, and said first and second current paths are connected to said capacitor.

References Cited by the Examiner
UNITED STATES PATENTS

| | | | |
|---|---|---|---|
| 2,176,742 | 10/1939 | La Pierre | 324—79 |
| 2,823,351 | 2/1958 | Page | 324—99 |
| 2,830,453 | 4/1958 | Jones | 324—99 |
| 2,941,146 | 6/1960 | Miller | 324—98 |
| 2,942,185 | 6/1960 | McGhee | 324—78 |
| 2,951,211 | 8/1960 | Brashear | 324—99 |
| 3,003,108 | 10/1961 | Thiele | 324—99 |
| 3,029,022 | 4/1962 | Horvath et al. | 324—69 |

WALTER L. CARLSON, *Primary Examiner.*

FREDERICK M. STRADER, *Examiner.*

C. W. HOFFMANN, M. J. LYNCH,
*Assistant Examiners.*